Sept. 2, 1941.    J. E. O'BRIEN    2,254,542
APPARATUS FOR SUPPORTING AND ELEVATING VEHICLES IN FREIGHT CARS
Filed Oct. 4, 1940    3 Sheets-Sheet 1
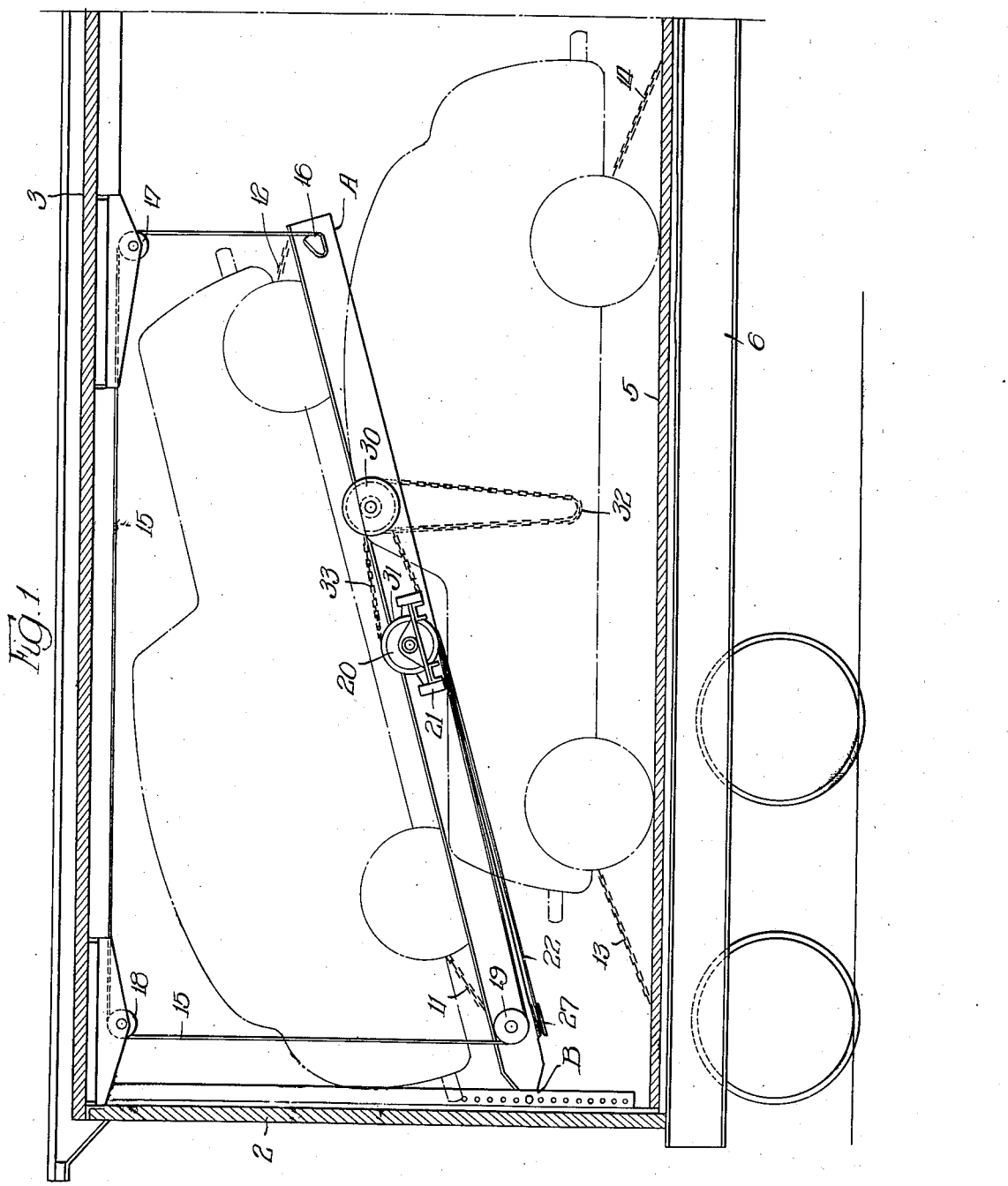
INVENTOR.
John E. O'Brien
BY

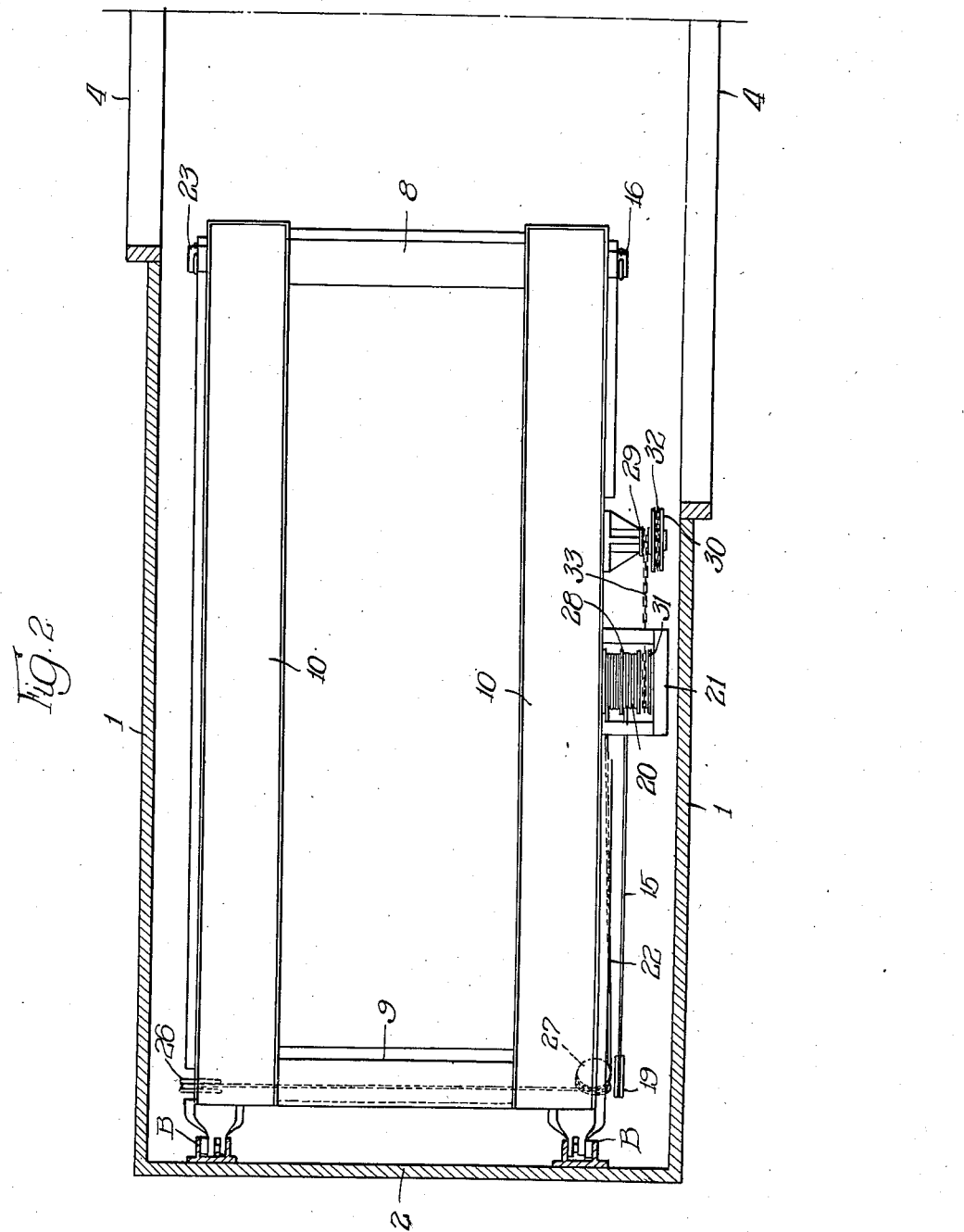

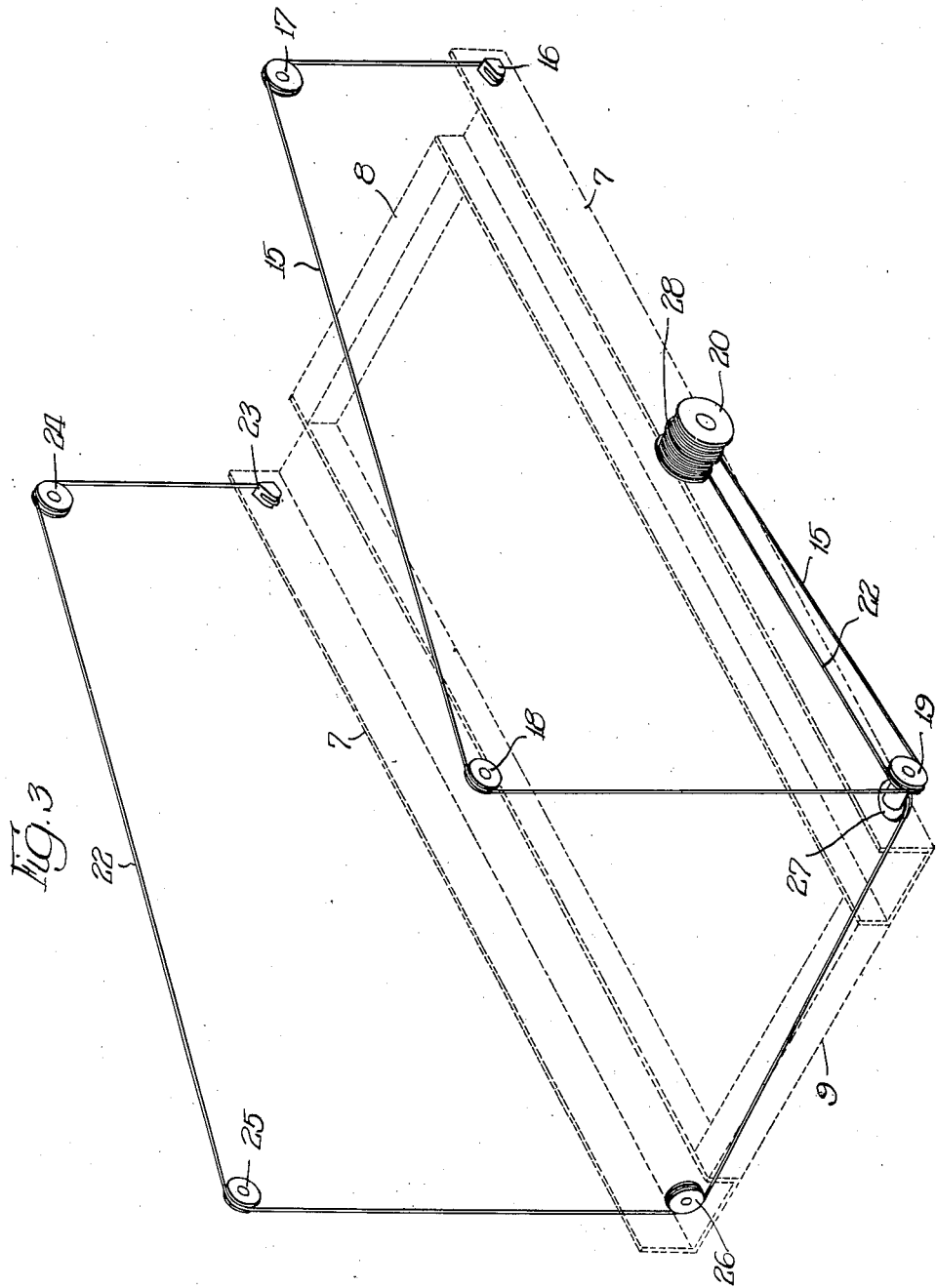

Patented Sept. 2, 1941

2,254,542

UNITED STATES PATENT OFFICE 2,254,542

APPARATUS FOR SUPPORTING AND ELEVATING VEHICLES IN FREIGHT CARS

John E. O'Brien, Chicago, Ill.

Application October 4, 1940, Serial No. 359,646

9 Claims. (Cl. 105—368)

This invention relates to improvements in apparatus for supporting and elevating vehicles in freight cars. The invention relates particularly to an improved arrangement of flexible members or hoisting cables by means of which a vehicle supporting deck may be elevated and supported in elevated position. The present invention constitutes an improvement on the Means for supporting and elevating automobiles in freight cars which is disclosed and claimed in the United States Patent to E. W. Henry et al., No. 2,164,456, issued July 4, 1939.

The object of this invention is to provide a novel cable arrangement for vehicle supporting decks, having the hoisting mechanism located on the deck itself.

A further object of this invention is to provide improved apparatus and mode of operation which reduces the amount of labor required and the time consumed in loading and unloading vehicles in a freight car.

Another important object of this invention is to provide a novel decking device for raising and inclining vehicles in a freight car, the decking device and cable arrangement being designed to provide more clearance, when raised to inclined position, for receiving all types and sizes of floor supported vehicles therebeneath.

A further object of the invention is to provide a novel cable arrangement for vehicle supporting decks, having the winding mechanism located on the deck itself and a winding drum for the cables located on one side of the deck.

Further objects of the invention will become apparent from the following description and the drawings relating thereto.

Preferably, in the use of this invention, four vehicles are supported in a freight car for transportation, two vehicles being supported directly on the car floor, and two vehicles being supported in a tilted position on the vehicle supporting decks, one deck being located at each end of the freight car.

It will be understood that various modifications may be made in the mechanism shown in the drawings without departing from the spirit of the invention.

Similar reference numerals and letters refer to similar parts throughout the drawings.

Figure 1 is a sectional, longitudinal view taken through one half of a freight car, showing one vehicle in elevated position on a deck, with a second floor supported vehicle underneath.

Figure 2 is a plan view of the deck, showing the pulleys, cables and winding drum associated therewith.

Figure 3 is a perspective view showing the pulleys, hoisting cables, deck frame and winding drum.

Referring to the drawings, 1 represents the sides of a freight car, 2 the end of the car, 3 the roof, 4 the staggered door openings, 5 the car floor and 6 the car underframe generally.

As shown on the drawings, the letter A designates the deck as a whole which comprises substantially U-shaped, longitudinally disposed side frame members 7, a front transverse frame member 8, a rear transverse member 9 and longitudinally disposed wheel supporting runways 10 which are mounted on the longitudinally disposed side frame members 7 of the deck frame.

The letter B indicates the means by which the rear end of the deck is indexed or pivoted at the desired elevation. This indexing arrangement is shown and described in the United States patent to Henry et al., No. 2,164,456, issued July 4, 1939. In the use of the present invention, the rear end of the deck may be indexed or pivoted in any desired manner.

Flexible tie-down members for the deck supported vehicle are designated by 11 and 12, and the numerals 13 and 14 designate tie-down members for anchoring the floor supported vehicle.

The deck is elevated and supported by means of my novel cable arrangement which includes a pair of continuous cables or flexible members which are wound upon a drum mounted on one side of the deck. One end of the cable 15 is suitably attached or anchored adjacent the front end of the deck, on one side thereof at 16. The cable 15 extends upwardly from the point of anchorage 16 and over a pulley 17 journaled adjacent the car roof and then extends parallel to the roof longitudinally of the car and over a second pulley 18, journaled adjacent the car roof in the vicinity of the end wall of the car. From the pulley 18, the cable 15 extends downwardly and under a pulley 19 journaled on the deck adjacent the rear end thereof. From the pulley 19 the cable 15 extends forwardly along the side of the deck to a winding drum 20 which is secured to the deck outwardly of the space between the wheel supporting runways as shown in Fig. 2 of the drawings by means of suitable brackets 21. Opposite the point 16 at which the cable 15 is anchored to the deck, one end of a second cable 22 is secured at 23 adjacent the front end of the opposite side of the deck. The cable 22 extends upwardly from the point of anchorage 23 and over a pulley 24 journaled adjacent the car roof opposite the pulley 17 and then extends parallel to the roof longitudinally of the car and over a second pulley 25 journaled adjacent the car roof in the vicinity of the end wall of the car opposite the pulley 18. From the pulley 25, the cable 22 extends downwardly and under a pulley 26 journaled on the deck adjacent the rear end thereof. From the pulley 26, the flexible member 22 extends transversely of the deck in the vicinity of the end transverse member 9 of the deck frame to and over a pulley 27 journaled on the bottom of the longitudinal deck frame member 7, near the pulley 19. From the pulley 27 the cable or flexible member 22 extends forwardly along the deck to the winding drum 20. The winding drum 20 is provided with a central divider 28 which provides a race on one side of the divider for winding the cable 15 on the drum and a race on the other side of the divider for winding the cable 22 on the drum.

As shown in the drawings, the pulleys 17, 18, 24 and 25 are preferably disposed parallel to the sides of the freight car. Preferably, the pulley 26 is disposed parallel to the rear transverse frame member 9 of the deck, pulley 27 is disposed parallel to the bottom of the longitudinally disposed side frame member 7 of the deck and pulley 19 is disposed parallel to the side of the frame member 7 of the deck.

In order to revolve the drum 20 so as to wind the cables 15 and 22 thereupon and elevate the deck, I provide means including chain sheaves 29, 30, 31 and chains 32 and 33. This drum winding apparatus may be operated by motor or by hand, and is fully shown and described in the U. S. patent to Henry et al., No. 2,164,456, issued July 4, 1939. It is to be understood that my novel cable arrangement may be used with any suitable apparatus for rotating the drum 20 and winding the cables 15 and 22 thereupon in order to elevate the deck, and unwinding the cables from the drum in order to lower the deck.

In the use of my invention, the vehicles may be loaded upon the floor of the freight car and on the decks in the manner described in the Henry et al. Patent No. 2,164,456, July 4, 1939. A deck supporting device of the type shown and described in the United States patent to Mussey, No. 2,165,406, July 11, 1939 may be used with my novel cable arrangement.

From the above it will be seen that my novel cable arrangement provides safe, convenient and accessible apparatus for elevating a vehicle supporting deck. The arrangement of the cables or flexible members, including the location of the drum on one side of the deck, provides a maximum amount of space or clearance for the vehicle supported upon the floor of the car, beneath the deck supported vehicle. This additional clearance makes it possible to load four vehicles of various size and manufacture for shipment in an ordinary freight car.

Although only one form of my invention has been described in detail, it will be apparent to those skilled in the art that various modifications may be made without departing from the scope of the appended claims.

I claim:

1. Means for supporting and elevating a vehicle supporting deck in a freight car comprising flexible members attached to the deck and cooperating with pulleys in the upper part of the car and on the deck, winding mechanism upon said deck including a single drum mounted outwardly of the deck to which the flexible members are connected and means for operating the winding mechanism.

2. Means for supporting and elevating a vehicle supporting deck with spaced wheel supporting runways in a freight car comprising flexible members attached to the deck and cooperating with pulleys in the upper part of the car and on the deck, winding mechanism upon said deck including a single drum located upon one side of the deck outwardly of the space between the runways to which the flexible members are connected.

3. Means for supporting and elevating a vehicle supporting deck in a freight car comprising flexible members attached to the deck and cooperating with pulleys in the upper part of the car and on the deck, winding mechanism upon said deck including a single drum located outwardly of the deck to which the flexible members are connected and means for operating said winding mechanism whereby the flexible members are wound upon said drum.

4. Means for supporting and elevating a vehicle in a freight car comprising a deck having spaced wheel supporting runways upon which the vehicle is held in position, a flexible member connected to an end corner of the deck and travelling over pulleys journaled adjacent the roof of the car and thence downwardly under a pulley on the deck and thence to a drum mounted on the deck outwardly of the space between the runways, a second flexible member connected to the opposite end corner of the deck and cooperating with pulleys journaled adjacent the roof of the car and thence downwardly under a pulley mounted on the deck and thence transversely beneath the deck adjacent one end thereof to a pulley mounted on the deck adjacent the deck pulley with which the first mentioned flexible member cooperates and thence to the winding drum.

5. Means for supporting and elevating a vehicle in a freight car comprising a deck provided with wheel supporting runways upon which the vehicle is held in position, a flexible member connected to an end corner of the deck and travelling over pulleys journaled adjacent the roof of the car and along one side thereof and thence downwardly under a pulley on the deck and thence to a drum mounted on the deck outwardly of the wheel supporting runways, a second flexible member connected to the opposite end corner of the deck and cooperating with pulleys journaled adjacent the roof of the car and along the opposite side thereof and thence downwardly under a pulley mounted on the deck and thence transversely beneath the deck adjacent one end thereof to a pulley mounted on the deck adjacent the deck pulley with which the first mentioned flexible member cooperates and thence to the winding drum and means for rotating said winding drum whereby said flexible members are wound upon the drum.

6. Means for supporting and elevating a vehicle supporting deck in a freight car comprising a pair of flexible members each having one end anchored to the deck, each of the flexible members cooperating with pulleys mounted adjacent the roof of the freight car and cooperating with pulleys mounted on the deck, the other end of each flexible member being associated with a winding drum which is mounted on one side of the deck outwardly of the wheel supporting runways of the deck.

7. Apparatus for supporting and elevating a vehicle supporting deck in a freight car comprising a pair of flexible members, one flexible member anchored to the deck at one end, thence extending upwardly to a pulley mounted adjacent the roof of the freight car, thence horizontally adjacent the car roof to a second pulley, thence downwardly to a pulley mounted on the deck, thence along the side of the deck to a winding drum which is mounted on the deck outwardly of the space between the wheel supporting runways of the deck, the second flexible member anchored to the deck at one end extending upwardly to a pulley adjacent the car roof, thence horizontally along the car roof to a second pulley, thence downwardly to a pulley mounted on the deck, thence transversely of the deck to a second pulley located upon the opposite side of the deck, thence along the side of the deck adjacent the first mentioned flexible member to the winding drum with which the first mentioned flexible member is associated.

8. The combination defined by claim 7 in which the flexible members are anchored adjacent the front end of the deck on opposite sides thereof.

9. Means for supporting and elevating a vehicle supporting deck in a freight car, said deck having wheel runways disposed longitudinally of the freight car and a pair of flexible members, one end of one flexible member being anchored adjacent the front end of the deck at one side thereof and one end of the second flexible member being anchored adjacent the front end of the deck on the opposite side thereof, intermediate portions of each flexible member cooperating with separate pulleys mounted adjacent the roof of the car and the other end of each flexible member terminating on a winding drum which is mounted on one side of the deck outwardly of the space between the runways.

JOHN E. O'BRIEN.